US 12,397,373 B2

(12) United States Patent
Hamamura

(10) Patent No.: US 12,397,373 B2
(45) Date of Patent: Aug. 26, 2025

(54) GROOVE PROCESSING DEVICE AND GROOVE PROCESSING METHOD

(71) Applicant: NIPPON STEEL CORPORATION, Tokyo (JP)

(72) Inventor: Hideyuki Hamamura, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 958 days.

(21) Appl. No.: 17/610,990

(22) PCT Filed: May 13, 2020

(86) PCT No.: PCT/JP2020/019105
§ 371 (c)(1),
(2) Date: Nov. 12, 2021

(87) PCT Pub. No.: WO2020/230816
PCT Pub. Date: Nov. 19, 2020

(65) Prior Publication Data
US 2022/0219261 A1    Jul. 14, 2022

(30) Foreign Application Priority Data
May 14, 2019  (JP) ................ 2019-091043

(51) Int. Cl.
*B23K 26/364*  (2014.01)
*B23K 26/066*  (2014.01)
(Continued)

(52) U.S. Cl.
CPC .......... *B23K 26/364* (2015.10); *B23K 26/066* (2015.10); *B23K 26/0821* (2015.10);
(Continued)

(58) Field of Classification Search
CPC ............... B23K 26/364; B23K 26/066; B23K 26/0821; B23K 26/064; B23K 26/0604;
(Continued)

(56) References Cited

U.S. PATENT DOCUMENTS 5,959,304 A * 9/1999 Tokita ................ G03F 7/7035
378/34
6,295,119 B1 * 9/2001 Suzuki ................ G03F 7/70358
355/53
(Continued)

FOREIGN PATENT DOCUMENTS

JP  1-232303 A   9/1989
JP  5-277776 A  10/1993
(Continued)

*Primary Examiner* — Vy T Nguyen
(74) *Attorney, Agent, or Firm* — Birch, Stewart, Kolasch & Birch, LLP

(57) ABSTRACT

A groove processing device that forms a groove in an object's surface using laser beams includes: a light source device that outputs the laser beams; a polygon mirror that reflects the laser beams that are output; a condensing optical system provided on an optical path of the laser beams that are reflected and focuses the laser beams; and a shielding plate provided between the condensing optical system and the object at a position which blocks some of the laser beams and blocks some of the laser beams. Among the laser beams that are focused, some that are not blocked form the groove in the surface of the object at a focus. The shielding plate is provided closer to the condensing optical system than the focus and is rotated with respect to the object's surface to block the laser beams that do not form the groove.

10 Claims, 4 Drawing Sheets

(51) Int. Cl.
*B23K 26/082* (2014.01)
*G02B 19/00* (2006.01)
*G02B 26/08* (2006.01)
*G02B 26/12* (2006.01)

(52) U.S. Cl.
CPC ..... *G02B 19/0052* (2013.01); *G02B 26/0816* (2013.01); *G02B 26/12* (2013.01)

(58) Field of Classification Search
CPC .. B23K 26/067; B23K 26/073; B23K 26/352; B23K 26/042; B23K 26/0608; B23K 26/0613; B23K 26/0648; B23K 26/0676; B23K 26/355; B23K 26/36; B23K 2101/42; B23K 26/032; B23K 26/046; B23K 26/06; B23K 26/0622; B23K 26/0643; B23K 26/0665; B23K 26/0738; B23K 26/08; B23K 26/082; B23K 26/356; B23K 26/3584; B23K 26/361; B23K 26/362; B23K 26/382; B23K 26/53; G02B 19/0052; G02B 26/0816; G02B 26/12; G02B 21/32; G02B 26/005; G02B 26/101; G02B 26/124; G02B 27/0927; G02B 27/0944; G02B 27/095; G02B 27/106; G02B 27/1073; G02B 27/1093; G02B 3/14; G02B 5/001; G02B 5/1871

USPC .... 219/121, 121.69, 121.75, 121.76, 121.61, 219/121.64, 121.65, 121.68, 121.72, 219/121.73, 121.8; 359/618, 629
See application file for complete search history.

(56) References Cited

U.S. PATENT DOCUMENTS

2015/0059932 A1    3/2015   Hirano et al.
2021/0053858 A1*   2/2021   Abramov ............... G02B 26/02

FOREIGN PATENT DOCUMENTS

| JP | 7-108394 A | 4/1995 |
| JP | 7-178581 A | 7/1995 |
| JP | 7-334602 A | 12/1995 |
| JP | 10-235484 A | 9/1998 |
| JP | 2002-28798 A | 1/2002 |
| JP | 2002-86288 A | 3/2002 |
| JP | 2002-292484 A | 10/2002 |
| JP | 2014161899 A * | 9/2014 |
| WO | WO 2013/181883 A1 | 10/2013 |

* cited by examiner

GROOVE PROCESSING DEVICE AND GROOVE PROCESSING METHOD

TECHNICAL FIELD OF THE INVENTION

The present invention relates to a groove processing device and a groove processing method that form a groove in an object using a laser. The present application claims priority based on Japanese Patent Application No. 2019-091043 filed on May 14, 2019, the contents of which are incorporated herein by reference.

RELATED ART

In the related art, a groove processing device is known which irradiate a surface of a steel sheet with a laser beam in a direction (scanning direction) intersecting a sheet travelling direction of the steel sheet, using a polygon mirror, to periodically form a groove in the surface of the steel sheet, thereby improving iron loss characteristics (see, for example, Patent Document 1).

PRIOR ART DOCUMENT

[Patent Document]
[Patent Document 1] Japanese Unexamined Patent Application, First Publication No. 2002-292484

DISCLOSURE OF THE INVENTION

Problems to be Solved by the Invention

As shown in FIGS. 1A and 1B, a laser beam LB incident on a polygon mirror 10 of the groove processing device is not a point light source and has a predetermined radius φ.

As shown in FIG. 1A, when the laser beam LB is incident so as to fall within one surface of the polygon mirror 10, the laser beam LB reflected by the polygon mirror 10 is focused on one spot on the surface of the steel sheet 20 through a condensing lens (hereinafter, simply referred to as a lens) 12, and a groove is formed at the spot on the surface of the steel sheet 20.

On the other hand, as shown in FIG. 1B, when the laser beam LB is incident on a corner portion in which two adjacent surfaces of the polygon mirror 10 meet, the laser beam LB is reflected from each of the two adjacent surfaces and is divided into two laser beams LB1 and LB2. The divided laser beams LB1 and LB2 are focused on the surface of the steel sheet 20 through the lens 12. As a result, an end portion of the groove in the scanning direction is processed by the laser beams LB1 and LB2 with insufficient energy densities. Therefore, the end portion of the groove is shallow, and it is difficult to form a uniform groove. In addition, the divided laser beams LB1 and LB2 are irradiated in a direction different from that of the laser beam LB. Therefore, there is a concern that a position different from the position where a groove is to be formed in the surface of the steel sheet 20 or devices and the like other than the surface of the steel sheet 20 will be erroneously processed.

In order to avoid this situation, a configuration is considered in which a shielding plate, such as a mask, is provided such that a portion corresponding to the end portion of the groove in the surface of the steel sheet 20 is not irradiated with the laser beams LB1 and LB2. However, this configuration has a problem that the shielding plate is processed and optical components are contaminated by minute pieces of the shielding plate generated by the processing.

The invention has been made in view of the above-mentioned problems, and an object of the invention is to provide a groove processing device and a groove processing method that suppress the contamination of optical components and achieve uniform groove processing and groove depth.

Means for Solving the Problem

Means for solving the problems include the following aspects.

(1) According to an embodiment of the invention, there is provided a groove processing device that forms a groove in a surface of an object using laser beams. The groove processing device includes: a light source device that outputs the laser beams; a polygon mirror that reflects the laser beams output from the light source device; a condensing optical system that is provided on an optical path of the laser beams reflected by the polygon mirror and focuses the laser beams; and a shielding plate that is provided between the condensing optical system and the object at a position which blocks some of the laser beams focused through the condensing optical system and blocks some of the laser beams. Among the laser beams focused through the condensing optical system, some of the laser beams that are not blocked by the shielding plate form the groove in the surface of the object at a focus of the laser beams. The shielding plate is provided closer to the condensing optical system than the focus and is rotated with respect to the surface of the object so as to block the laser beams that do not form the groove.

(2) In the groove processing device according to (1), when an angle of the shielding plate with respect to the surface of the object is $\psi$ and a critical angle which is a maximum angle at which the laser beam falls within one plane mirror of the polygon mirror is $\theta c(°)$, the angle $\psi$ of the shielding plate may be inclined in a range of $2\theta c < \psi \le 90(°)$.

(3) In the groove processing device according to (2), assuming that a position where a perpendicular line is drawn from a rotation axis of the polygon mirror to the plane mirror of the polygon mirror is a reference position, an angle formed between a boundary between two adjacent plane mirrors of the polygon mirror and the reference position is $\theta 0(°)$, a position where the shielding plate, which is inclined at the angle $\psi$, is irradiated with the laser beam reflected by the polygon mirror at an angle of $2\theta 0(°)$ when a rotation angle of the polygon mirror is $\theta 0(°)$ is a point P0, a position where the shielding plate, which is inclined at the angle $\psi$, is irradiated with the laser beam reflected by the polygon mirror at an angle of $2\theta c(°)$ when the rotation angle of the polygon mirror is $\theta c(°)$ is a point P, a height difference between the point P and the point P0 is Lp0, and a distance from the condensing optical system to a height of the point P is L2, $Lp0 < L2$ may be satisfied.

(4) The groove processing device according to any one of (1) to (3) may further include: a position adjustment portion that adjusts a position of the shielding plate in a scanning direction in which scanning is performed with the laser beams by the polygon mirror.

(5) The groove processing device according to any one of (1) to (4) may further include: a housing that has the shielding plate disposed in a lower portion. The housing may have an upper opening portion that is located on the optical path of the laser beams focused by the condensing optical system, and a colorless and transparent window plate that transmits the laser beams without absorbing or reflecting the laser beams may be attached to the upper opening portion.

(6) According to an embodiment of the invention, there is provided a groove processing method that forms a groove in a surface of an object using laser beams. The groove processing method includes: an output step of outputting the laser beams from a light source device; a reflection step of reflecting the laser beams output from the light source device by a polygon mirror; a condensing step of focusing the laser beams on the surface of the object using a condensing optical system that is provided on an optical path of the laser beams reflected by the polygon mirror; and a shielding step of blocking some of the laser beams using a shielding plate that is provided between the condensing optical system and the object at a position which blocks some of the laser beams focused through the condensing optical system. Among the laser beams focused through the condensing optical system, some of the laser beams that are not blocked by the shielding plate form the groove in the surface of the object at a focus of the laser beams. In the shielding step, the shielding plate is provided closer to the condensing optical system than the focus and is rotated with respect to the surface of the object so as to block the laser beams that do not form the groove.

(7) In the groove processing method according to (6), in the shielding step, when an angle of the shielding plate with respect to the surface of the object is $\psi$ and a critical angle which is a maximum angle at which the laser beam falls within one plane mirror of the polygon mirror is $\theta c(°)$, the angle $\psi$ of the shielding plate may be inclined in a range of $2\theta c < \psi \leq 90(°)$.

(8) In the groove processing method according to (7), in the shielding step, assuming that a position where a perpendicular line is drawn from a rotation axis of the polygon mirror to the plane mirror of the polygon mirror is a reference position, an angle formed between a boundary between two adjacent plane mirrors of the polygon mirror and the reference position is $\theta 0(°)$, a position where the shielding plate, which is inclined at the angle $\psi$, is irradiated with the laser beam reflected by the polygon mirror at an angle of $2\theta 0(°)$ when a rotation angle of the polygon mirror is $\theta 0(°)$ is a point P0, a position where the shielding plate, which is inclined at the angle $\psi$, is irradiated with the laser beam reflected by the polygon mirror at an angle of $2\theta c(°)$ when the rotation angle of the polygon mirror is $\theta c(°)$ is a point P, a height difference between the point P and the point P0 is Lp0, and a distance from the condensing optical system to a height of the point P is L2, Lp0<L2 may be satisfied.

(9) The groove processing method according to any one of (6) to (8) may further include: a shielding plate position adjustment step of adjusting a position of the shielding plate in a scanning direction in which scanning is performed with the laser beams by the polygon mirror.

(10) The groove processing method according to any one of (6) to (9) may further include: a housing attachment step of attaching a colorless and transparent window plate that transmits the laser beams without absorbing or reflecting the laser beams to an upper opening portion of a housing that has the shielding plate disposed in a lower portion and has the upper opening portion which is located on the optical path of the laser beams focused by the condensing optical system.

Effects of the Invention

According to the invention, the shielding plate is inclined to reduce the damage of the shielding plate which occurs when the shielding plate blocks the laser beam. Therefore, it is possible to provide a groove processing device and a groove processing method that suppress the contamination of optical components and achieve uniform groove processing and groove depth.

EMBODIMENTS OF THE INVENTION

Figure 1A:
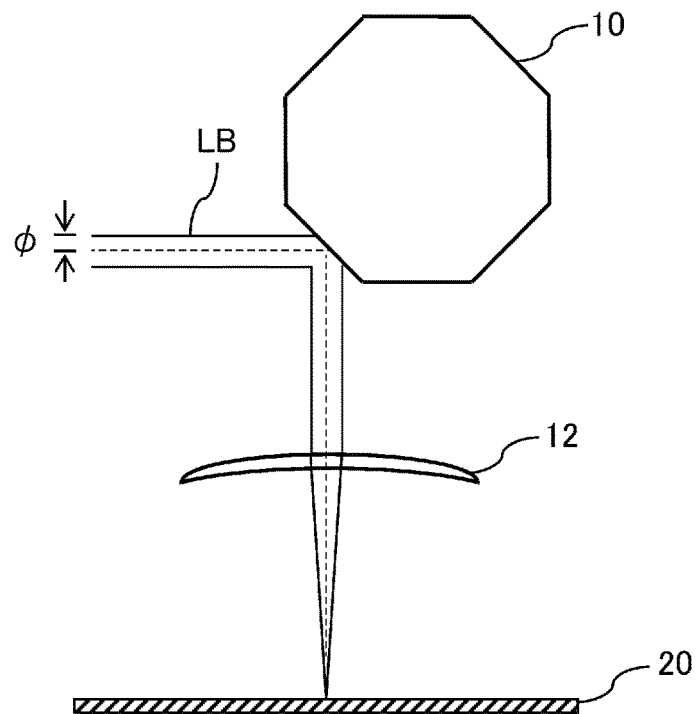
FIG. 1A is a schematic diagram showing a state in which a laser beam reflected from a polygon mirror is focused on a surface of a steel sheet when the laser beam is incident so as to fall within one surface of the polygon mirror.
Figure 1B:
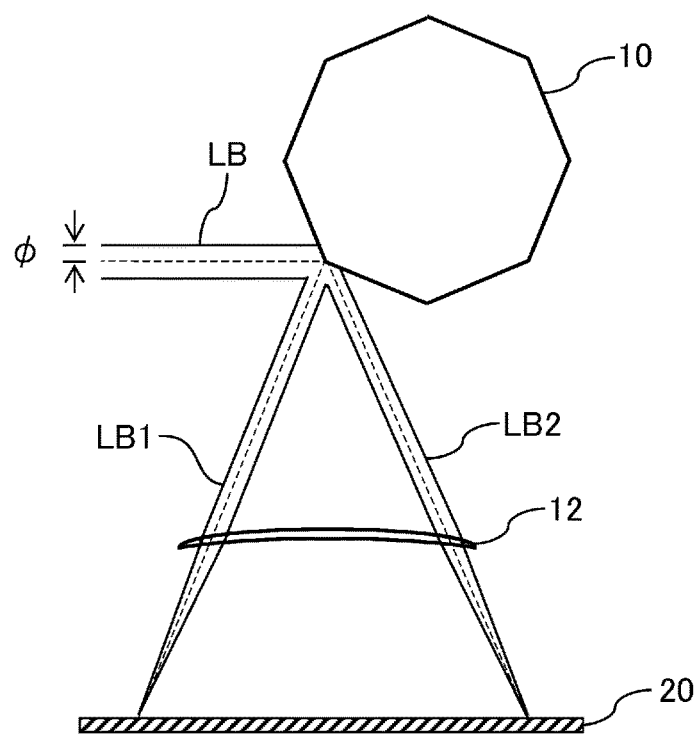
FIG. 1B is a schematic diagram showing a state in which the laser beam reflected from each of two adjacent surfaces is focused on the surface of the steel sheet when the laser beam is incident across the two adjacent surfaces of the polygon mirror.

Hereinafter, an embodiment of the invention will be described with reference to the drawings. In the specification and the drawings, the same components are designated by the same reference numerals.

Figure 2:
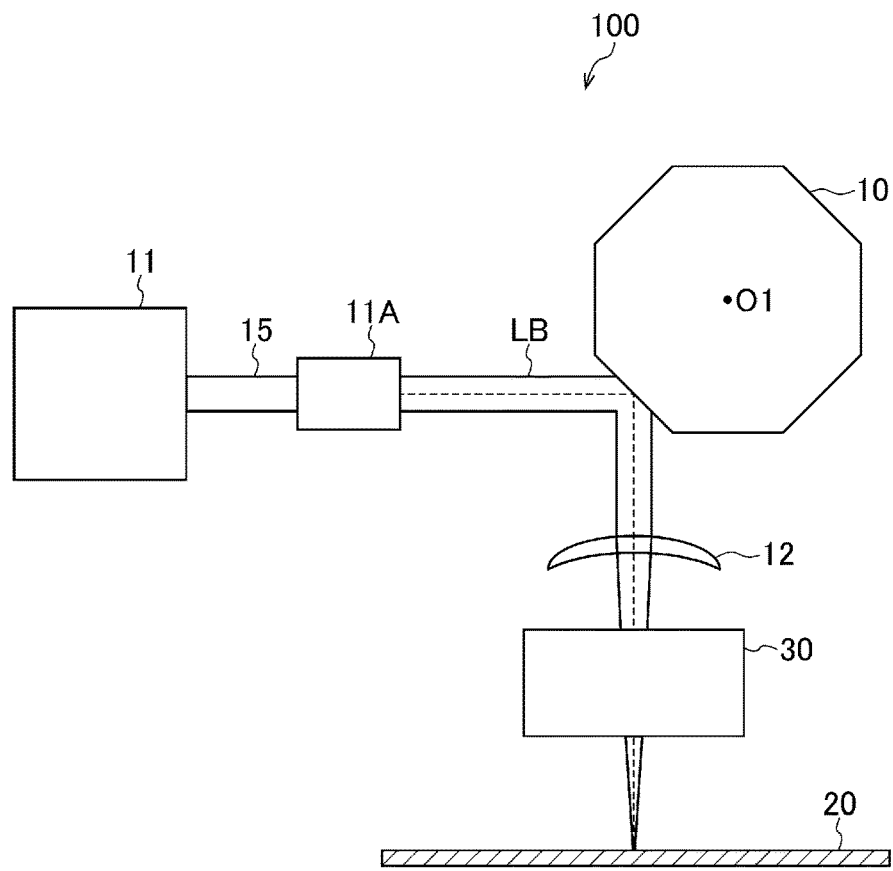
FIG. 2 is a schematic diagram showing a configuration of a groove processing device according to an embodiment of the invention as viewed from a rolling direction of the steel sheet.

FIG. 2 schematically shows a configuration of a groove processing device 100 according to the embodiment of the invention as viewed from a rolling direction of a steel sheet 20. The groove processing device 100 is a device that periodically forms a groove in a surface of the steel sheet 20, which is an object to be processed, using a laser. The steel sheet 20 is made of, for example, a well-known grain-oriented electrical steel sheet material. In the groove processing device 100, the position of the steel sheet 20 in a width direction is set on the basis of the length and position of the groove formed in the surface of the steel sheet 20, and the position of the steel sheet 20 in a longitudinal direction is set on the basis of the dimensions of the groove processing device 100. The width direction of the steel sheet 20 is a scanning direction of the laser and is a left-right direction of the plane of paper in FIG. 2. The longitudinal direction of the steel sheet 20 is the rolling direction of the steel sheet 20 and is a depth direction of the plane of paper in FIG. 2.

As shown in FIG. 2, the groove processing device 100 includes a polygon mirror 10, a light source device 11, a collimator 11A, a lens 12, and a movable shielding plate device 30.

The polygon mirror 10 has, for example, a regular polygonal prism shape, and a plurality of (N) plane mirrors are provided on each of a plurality of side surfaces constituting a regular polygonal prism. A laser beam LB is incident on the polygon mirror 10 from the light source device 11 through the collimator 11A in one direction (horizontal direction) and is then reflected by the plane mirror (reflection step).

The polygon mirror 10 has a configuration in which it can be rotated on a rotation axis O1 by the driving of a motor (not shown), and the incident angle of the laser beam LB on the plane mirror changes sequentially depending on the rotation angle of the polygon mirror 10. Therefore, the polygon mirror 10 sequentially changes the reflection direction of the laser beam LB such that the steel sheet 20 is scanned with the laser beam LB in the width direction.

In addition, FIGS. 1A, 1B, 2, and 3 show an example in which the polygon mirror 10 has eight plane mirrors. However, the number of plane mirrors constituting the polygon mirror 10 is not particularly limited.

The light source device 11 outputs a laser beam using a predetermined irradiation method (for example, a continuous irradiation method or a pulse irradiation method) under the control of a control unit (not shown) (output step).

The collimator 11A is connected to the light source device 11 through an optical fiber cable 15. The collimator 11A adjusts the radius of the laser beam output from the light source device 11 and outputs the adjusted laser beam LB to the polygon mirror 10. The laser beam LB output to the polygon mirror 10 has a laser diameter having a predetermined radius φ, and the laser diameter is that of a circle. However, the laser diameter may be that of an ellipse. In this case, an elliptical condensing shape can be formed by inserting a cylindrical lens or a cylindrical mirror between the collimator 11A and the polygon mirror 10 to change the radius of the beam along one axis (for example, a scanning direction).

The lens 12 is a condensing optical system that is provided on the optical path of the laser beam reflected by the polygon mirror 10 and is manufactured by performing processing, such as grinding and polishing, on a piece of glass. In addition, a mirror may be adopted as the condensing optical system constituting the groove processing device 100 instead of the condensing lens 12.

The lens 12 may have a non-condensing portion (not shown) that is integrally provided outside (in the outer circumference of) the lens 12. The non-condensing portion is located on the optical paths of laser beams LB1 and LB2 that have been divided and reflected from a corner portion in which two adjacent plane mirrors of the polygon mirror 10 meet and transmits the divided laser beams LB1 and LB2. The non-condensing portion is a planar optical system of a donut-shaped plate. The non-condensing portion does not have a focus because the focal length thereof is infinite. Since the laser beams LB1 and LB2 that have passed through the non-condensing portion are not focused, they do not have a high energy density. Therefore, even when a shielding plate 35 is irradiated with the laser beams LB1 and LB2 that have passed through the non-condensing portion, the damage of the shielding plate 35 is small. In addition, the non-condensing portion may not be the planar optical system and may be, for example, an optical system that diverges the divided laser beams LB1 and LB2.

The movable shielding plate device 30 which will be described below is provided between the lens 12 and the steel sheet 20. The movable shielding plate device 30 is disposed on the optical path of the laser beam LB that is reflected by the polygon mirror 10 and passes through the lens 12. The laser beam LB reflected by the polygon mirror 10 passes through the lens 12 and the movable shielding plate device 30 and is focused on the surface of the steel sheet 20 (condensing step). Therefore, a groove is formed in the surface of the steel sheet 20.

Further, in a groove processing method which irradiates the surface of the steel sheet 20 with the laser beam LB to form a groove, base steel sheet is melted and removed to form a groove. Therefore, as the groove becomes deeper, the probability that a molten protrusion will occur on the surface becomes higher. Therefore, the groove processing device 100 may be configured to include a supply nozzle (not shown) which injects an assist gas for blowing off a molten material and is provided at a predetermined position. Further, the collimator 11A, the polygon mirror 10, the lens 12, and the movable shielding plate device 30 of the groove processing device 100 may be covered with a housing (not shown), and the inside of the housing may be filled with a clean gas such that the internal pressure of the housing is positive. In this case, it is possible to prevent a molten material and the like from entering the housing and to prevent the optical system of the groove processing device 100 from being contaminated by the molten material and the like.

Figure 3:
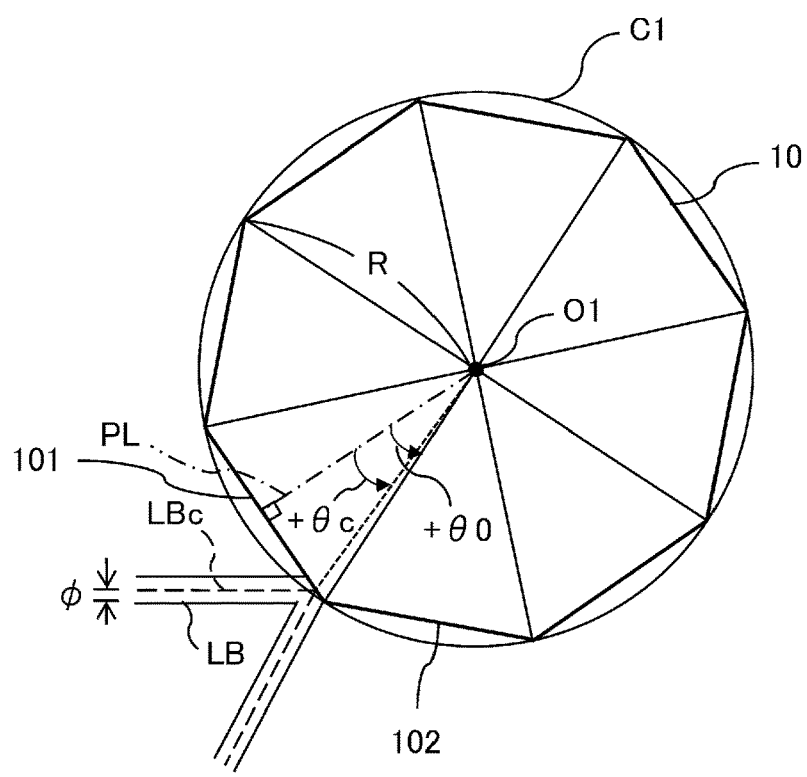
FIG. 3 is a schematic diagram showing a rotation angle of the polygon mirror.

Next, the rotation angle of the polygon mirror 10 will be described with reference to FIG. 3. In this embodiment, it is assumed that the rotation angle θ(°) of the polygon mirror 10 is defined by a central angle with respect to a reference position for each of the plane mirrors constituting the polygon mirror 10. As shown in FIG. 3, it is assumed that a position where a perpendicular line PL is drawn from the rotation axis O1 of the polygon mirror 10 to a plane mirror 101 is the reference position (θ=0(°)). The rotation angle θ of the polygon mirror 10 is an angle (central angle) formed between the position of a center LBc of the laser beam LB incident on each plane mirror and the reference position (θ=0(°)). In FIG. 3, a counterclockwise angle from the reference position (θ=0(°)); the perpendicular line PL) is defined as a positive angle, and a clockwise angle from the reference position is defined as a negative angle.

An angle θ0 formed between the reference position (θ=0(°)) in each plane mirror and a boundary with an adjacent plane mirror is 180(°)/N. The rotation angle θ of one plane mirror is defined in the range of −θ0≤θ≤+θ0. Therefore, in FIG. 3, the rotation angle θ=+θ0 of the plane mirror 101 and the rotation angle θ=−θ0 of a plane mirror 102 adjacent to the plane mirror 101 in the counterclockwise direction indicate the same position on the polygon mirror 10.

In this embodiment, the maximum angle at which the incident laser beam LB falls within one surface (one plane mirror) of the polygon mirror 10 is defined as a critical angle θc. That is, when the laser beam LB is totally reflected by one plane mirror without being divided by a corner portion in which two adjacent plane mirrors of the polygon mirror 10 meet, the critical angle θc is the maximum angle at which the center LBc of the laser beam LB is located. Assuming that the radius (circumscribed radius) of a circumscribed circle Cl of the polygon mirror 10 is R and the radius of the laser beam LB incident on the polygon mirror 10 is φ, the critical angle θc is defined by the following Expression (1).

$$\theta c = \sin^{-1}[(R \times \sin\theta 0 - \varphi)/R] \quad (1)$$

Figure 4:
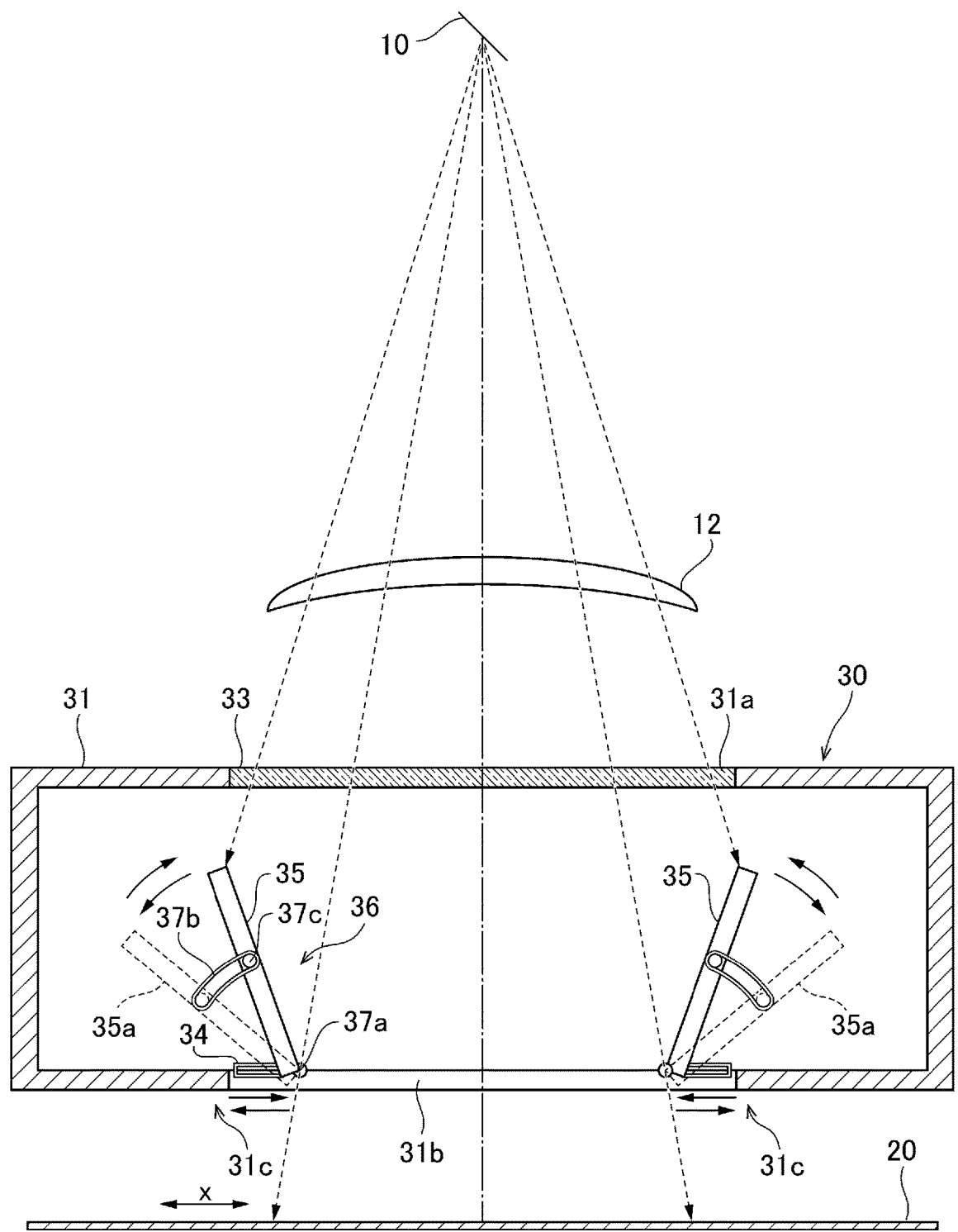
FIG. 4 is a schematic diagram showing a configuration of a movable shielding plate device.

Next, a specific configuration of the movable shielding plate device 30 will be described with reference to FIG. 4. As shown in FIG. 4, the movable shielding plate device 30 has a configuration in which it has a box-shaped housing 31 formed of, for example, a metal material and a pair of shielding plates 35 disposed so as to face each other in a scanning direction x of the laser beam LB are disposed in a lower portion of the housing 31. In addition, the shielding plate 35 is rotated on a rotating portion 37a as a fulcrum, which will be described below. In FIG. 4, 35a indicates the shielding plate when the shielding plate 35 is inclined by rotation.

In the housing 31, an upper opening portion 31a is formed in an upper portion that is located on the optical path of the laser beam LB focused by the lens 12, a lower opening portion 31b is formed in a lower portion, and a colorless and transparent window plate 33 is attached to the upper opening portion 31a (housing attachment step). The window plate 33 is, for example, a glass plate. The window plate 33 transmits the laser beam without absorbing or reflecting the laser beam. For example, the window plate 33 is obtained by coating both surfaces of a synthetic quartz glass plate with antireflection films. Therefore, the upper opening portion 31a can be closed by the window plate 33, and the laser beam LB that has been reflected by the polygon mirror 10 and passed through the lens 12 can pass through the upper portion of the housing 31.

Further, the laser beam LB which has passed through the window plate 33 from the lens 12 passes through the lower opening portion 31b of the housing 31, and the surface of the steel sheet 20 is irradiated with the laser beam LB. When the polygon mirror 10 is rotated, the inclination angle of the laser beam LB changes depending on the rotation angle of the polygon mirror 10. The irradiation position of the laser beam LB passing through the movable shielding plate device 30 is moved on the surface of the steel sheet 20 in the width direction of the steel sheet 20. That is, the laser beam LB passing through the movable shielding plate device 30 is moved on the surface of the steel sheet 20 in the width direction of the steel sheet 20 as the scanning direction x.

In the lower opening portion 31b of the housing 31, the shielding plates 35 are provided in the vicinity of opening portion ends 31c which are disposed so as to face each other in the scanning direction x of the laser beam LB. The shielding plate 35 is provided between the lens 12 and the steel sheet 20. That is, the shielding plate 35 is provided closer to the lens 12 than the focus of the laser beam LB that has passed through the lens 12. The shielding plate 35 blocks some of the laser beams focused through the lens 12 (shielding step). The pair of shielding plates 35 disposed so as to face each other in the scanning direction x of the laser beam LB have the same configuration and are formed of, for example, a steel material in a plate shape. Each of the shielding plates 35 is provided with a position adjustment portion 34 that adjusts the position of the shielding plate 35 in the scanning direction x of the laser beam LB and an angle adjustment portion 36 that adjusts the angle of a plate surface of the shielding plate 35 with respect to the surface of the steel sheet 20.

In this embodiment, the position adjustment portion 34 is, for example, a guide groove that is formed in the lower opening portion 31b of the housing 31, and the guide groove is formed along the scanning direction x of the laser beam LB. The position adjustment portion 34 is provided such that the shielding plate 35 can be slid in the guide groove and moves the shielding plate 35 along the guide groove in the scanning direction x of the laser beam LB (shielding plate position adjustment step).

As described above, the position adjustment portion 34 adjusts the position of the shielding plate 35 in the scanning direction x of the laser beam LB such that the shielding plate 35 is irradiated with the laser beam LB moved to the end portion of the steel sheet 20 in the width direction when the laser beam LB that has passed through the lens 12 is moved from the center to the end portion of the steel sheet 20 along the scanning direction x. This configuration makes it possible to adjust the range of the scanning direction x (the width direction of the steel sheet 20) in which the shielding plate 35 is irradiated with the laser beam LB.

The shielding plate 35 blocks some of the laser beams LB that are focused through the lens 12 and moved in the scanning direction x at the end in the scanning direction such that the surface of the steel sheet 20 is not irradiated with the laser beam LB at the end in the scanning direction and no grooves are formed in the surface of the steel sheet 20. On the other hand, among the laser beams LB which are focused through the lens 12 and moved in the scanning direction x, the remaining laser beams LB which are not blocked by the shielding plate 35 converge into the focus of the laser beams LB on the surface of the steel sheet 20 to form a groove.

Therefore, the shielding plate 35 blocks unnecessary beams which are irradiated with positions other than a groove processing position on the steel sheet 20 among the laser beams LB which have been reflected by the plane mirror of the rotating polygon mirror 10 and have a high energy density or the laser beams LB1 and LB2 which have been divided in the corner portion of the polygon mirror 10 and have a low energy density. Therefore, the end portion of the groove in the scanning direction x is not shallow, and positions other than the position of the groove on the steel sheet 20 are not processed. As a result, it is possible to achieve uniform groove processing and groove depth in the steel sheet 20.

In this embodiment, the angle adjustment portion 36 includes the rotating portion 37a that enables the shielding plate 35 to rotate with respect to the lower portion of the housing 31, a guide portion 37b that defines a trajectory on which the shielding plate 35 is inclined, and a connection portion 37c that rotatably connects the shielding plate 35 to the guide portion 37b. The shielding plates 35 are rotated such that the surfaces of the shielding plates 35 face each other. Therefore, the rotating portion 37a rotates the shielding plate 35 on a rotation axis to incline a flat sheet surface of the shielding plate 35 with respect to the surface of the steel sheet 20.

In the case of this embodiment, the rotating portion 37a and the guide portion 37b are provided so as to be slidable along the scanning direction of the laser beam LB by the position adjustment portion 34 in operative association with the shielding plate 35. That is, the rotating portion 37a has a configuration in which it is provided in, for example, the position adjustment portion 34 and is movable along the scanning direction of the laser beam LB by the sliding of the position adjustment portion 34. In addition, the guide portion 37b is, for example, a guide groove that is provided in a part of the position adjustment portion 34 along the inner wall of the housing 31 and has a configuration in which it is movable along the scanning direction by the sliding of the position adjustment portion 34 and guides the trajectory of the connection portion 37c such that the shielding plate 35 having the connection portion 37c can be moved along the scanning direction of the laser beam LB.

Here, the guide portion 37b is, for example, an annular member that is made of a metal material or the like and has a curved elongated hole, and the connection portion 37c provided in the shielding plate 35 is moved along the curved elongated hole. In this case, the connection portion 37c is, for example, a protrusion member that is disposed in the elongated hole of the guide portion 37b and is moved along the elongated hole of the guide portion 37b. The shielding plate 35 is rotated on the rotating portion 37a that is provided in the lower end portion of the shielding plate 35, and the connection portion 37c is moved along the curved elongated hole of the guide portion 37b to change the inclination angle of the shielding plate 35 with respect to the surface of the steel sheet 20.

The shielding plate 35 is rotated with respect to the surface of the steel sheet 20 so as to block the laser beam LB that does not form a groove. Therefore, the angle adjustment portion 36 adjusts the angle of the shielding plate 35 with respect to the steel sheet 20 to prevent the shielding plate 35 from being irradiated with the laser beam LB having a high energy density when the shielding plate 35 is irradiated with the laser beams LB. Therefore, it is possible to reduce the damage of the shielding plate 35 caused by irradiation with the laser beam LB.

That is, the laser beam LB has a laser diameter having a predetermined radius $\varphi$. However, the size of the laser diameter that appears on the shielding plate 35 changes due to a change in the angle of the shielding plate 35 with respect to the laser beam LB, which causes a change in the energy density of the laser beam LB irradiated with the shielding plate 35. Therefore, it is possible to set the shielding plate 35 to an angle at which the damage of the shielding plate 35 is reduced.

Further, the laser beam LB is focused by the lens 12 so as to have the highest energy density on the surface of the steel sheet 20 on which the laser beam LB is focused. Therefore, an object that is at the same distance (that is, a focal length) as the distance from the lens 12 to the steel sheet 20 is irradiated with the laser beam LB having a high energy density. As the distance from the lens increases, the energy density decreases. Therefore, the shielding plate 35 that is provided closer to the lens 12 than the focus is inclined to balance the distance from the lens 12 and the change in the laser diameter, which makes it possible to obtain a suitable energy density and to reduce the damage of the shielding plate 35.

Figure 5:
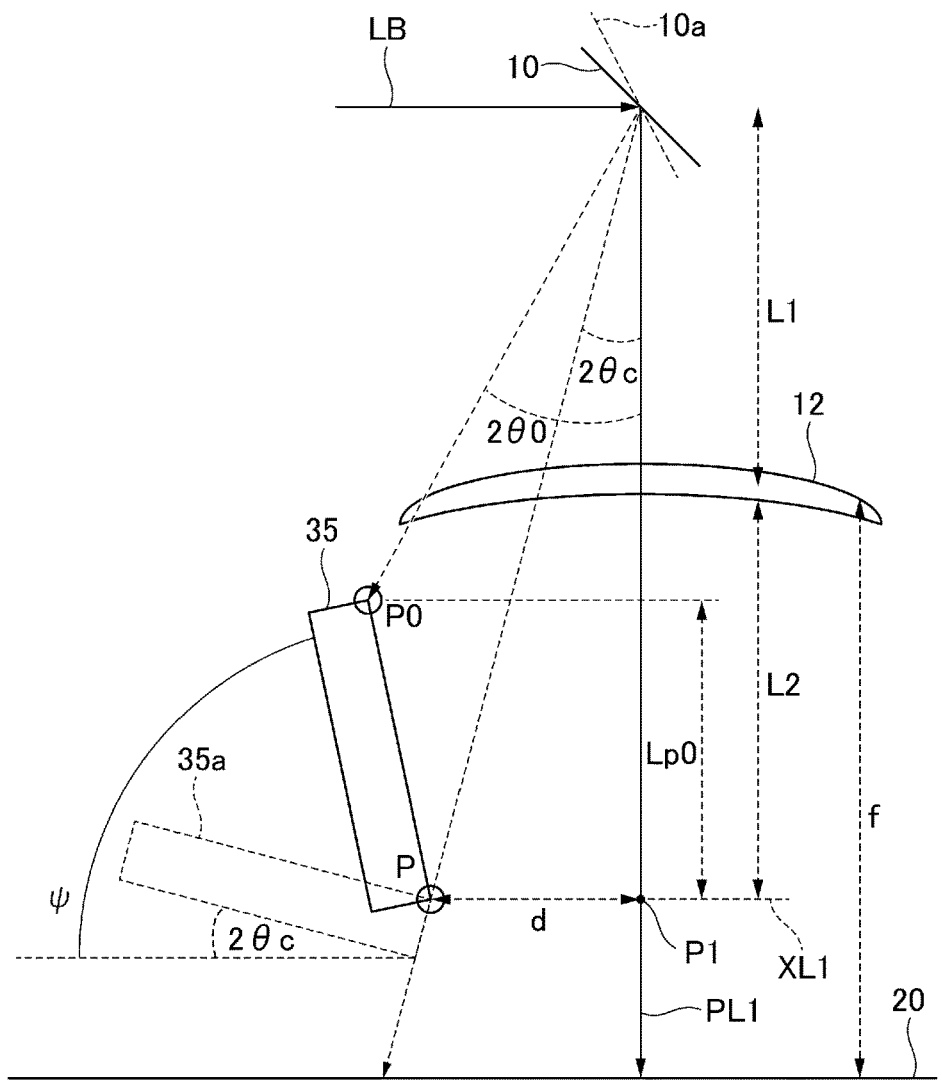
FIG. 5 is a schematic diagram showing the optimum position and angle of a shielding plate.

Next, the position of the shielding plate 35 in the scanning direction of the laser beam LB will be described with reference to FIG. 5. In addition, in FIG. 5, 10a indicates a portion of the plane mirror when the polygon mirror 10 is rotated. In this case, it is assumed that the focal length of the lens 12 which is the condensing optical system is f. When the polygon mirror 10 is rotated by $\theta(°)$, the laser beam LB reflected by the polygon mirror 10 is moved by $2\theta(°)$. Then, when the rotation angle $\theta(°)$ of the polygon mirror 10 is from $\theta c(°)$ to $\theta 0(°)$, the laser beam LB needs to be blocked by the shielding plate 35.

Here, it is assumed that a distance from the plane mirror of the polygon mirror 10 to the lens 12 which is the condensing optical system is L1. Further, it is assumed that a distance from the lens 12 which is the condensing optical system to the height of a point P at the position where the shielding plate 35 is irradiated with the laser beam LB reflected by the polygon mirror 10 at an angle of $2\theta c(°)$ when the rotation angle $\theta$ of the polygon mirror 10 is $\theta c(°)$ is L2. In addition, in this embodiment, as shown in FIG. 5, the lower end portion of the shielding plate 35 in which the rotating portion 37a is provided is the point P.

Furthermore, it is assumed that a perpendicular line which is drawn from the polygon mirror 10 to the steel sheet 20 and through which the laser beam LB passes when the rotation angle $\theta$ of the polygon mirror 10 is $0(°)$ is PL1. Moreover, it is assumed that a straight line which horizontally extends from the point P at the position where the shielding plate 35 is irradiated with the laser beam LB reflected by the polygon mirror 10 when the rotation angle $\theta$ of the polygon mirror 10 is $\theta c(°)$ to the perpendicular line PL1 is XL1. Then, assuming that the point where the perpendicular line PL1 through which the laser beam LB passes and the straight line XL1 from the point P intersect each other is P1, a distance d between the point P and the point P1 can be represented by the following Expression (2). In addition, as described above, $\varphi$ indicates the radius of the laser beam LB incident on the polygon mirror 10 (FIG. 3).

$$d = (L1 + L2) \times \tan 2\theta c - \{\varphi / f \times (f - L2) / \cos 2\theta c\} \quad (2)$$

In this embodiment, the position adjustment portion 34 moves the shielding plate 35 in the scanning direction of the laser beam LB to adjust the distance d from the perpendicular line PL1 through which the laser beam LB passes to the position of the shielding plate 35 to the distance d calculated by the above-mentioned Expression (2).

Next, an angle $\psi$ of the shielding plate 35 with respect to the surface of the steel sheet 20 will be described with reference to FIG. 5. In this case, the angle $\psi$ of the shielding plate 35 is an angle formed between the surface direction of the surface of the steel sheet 20 and the plate surface of the shielding plate 35. Here, the energy density of the laser beam LB is highest at the point P of the shielding plate 35 when the angle $\psi$ of the shielding plate 35 with respect to the surface of the steel sheet 20 is $2\theta c(°)$ at which the laser beam LB is vertically incident on the shielding plate 35.

Therefore, it is desirable to incline the shielding plate 35 as much as possible while avoiding that the angle $\psi$ of the shielding plate 35 is close to $2\theta c(°)$ in order to avoid the damage of the surface of the shielding plate 35 by the laser beam LB as much as possible.

Assuming that the energy density of the laser beam LB when the angle $\psi$ of the shielding plate 35 is $\psi = 2\theta c$ is Ipc, the energy density Ipc of the laser beam LB can be represented by the following Expression (3). In addition, P indicates the laser power (W) of the laser beam LB.

$$Ipc = P / \{\pi \times (\varphi / f \times (f - L2))^2\} \quad (3)$$

The energy density Ip of the laser beam LB when the shielding plate 35 is inclined at the angle $\psi$ can be represented by the following Expression (4).

$$Ip = Ipc \times \cos(\psi - 2\theta c) \quad (4)$$

When the angle $\psi$ of the shielding plate 35 is from $0(°)$ to $2\theta c(°)$, the focusing diameter of the laser beam LB is small, and the energy density Ip of the laser beam LB is high in a portion other than the point P, which is not desirable. In addition, when the angle $\psi$ of the shielding plate 35 is $90(°)$ or greater, the shielding plate 35 is inclined too much, and the influence of the laser beam LB irradiated with the side surface of an upper portion of the shielding plate 35 is large. Therefore, unexpected processing is performed, which is not desirable.

Therefore, it is desirable that the angle ψ of the shielding plate 35 is 2θc<ψ≤90(°). In this embodiment, the angle adjustment portion 36 changes the inclination of the shielding plate 35 using the rotating portion 37a as the rotation axis to adjust the angle ψ of the shielding plate 35 with respect to the surface of the steel sheet 20 in the range of 2θc<ψ≤90(°).

When the angle ψ of the shielding plate 35 is large, the lens 12 which is the condensing optical system is close to the tip of the shielding plate 35. For this reason, it is not desirable that the angle ψ of the shielding plate 35 is too large. Therefore, it is more desirable that the angle ψ of the shielding plate 35 is 80(°) or less.

Next, constraint conditions will be described. Here, it is assumed that, when the shielding plate 35 is inclined at the angle ψ, the position where the shielding plate 35 is irradiated with the laser beam LB reflected by the polygon mirror 10 at an angle of 2θ0(°) when the rotation angle θ of the polygon mirror 10 is θ0(°) is a point P0.

Then, similarly, assuming that, when the shielding plate 35 is inclined at the angle ψ, the height difference between the point P at the position where the shielding plate 35 is irradiated with the laser beam LB reflected by the polygon mirror 10 at an angle of 2θc(°) when the rotation angle θ of the polygon mirror 10 is θc(°) and the point P0 is Lp0, Lp0 can be represented by the following Expression (5).

$$Lp0 = (L1 + L2) \times \tan 2\theta 0 \times \sin\psi / \{\sin(90 + 2\theta 0 - \psi) \times \cos 2\theta 0\} \quad (5)$$

Here, the height difference Lp0 needs to be smaller than the distance L2 from the lens 12 which is the condensing optical system to the height of the point P. Therefore, Lp0<L2 needs to be satisfied.

In the above-mentioned configuration, in the groove processing device 100, the shielding plate 35 provided between the lens 12 and the steel sheet 20 blocks the laser beam LB that has passed through the lens 12, and the angle adjustment portion 36 inclines the shielding plate 35 at the angle ψ with respect to the surface of the steel sheet 20 when an end portion of a groove is formed in the surface of the steel sheet 20. As described above, in the groove processing device 100, the shielding plate 35 is inclined at the angle ψ to reduce the damage of the shielding plate 35 which occurs when the shielding plate 35 blocks the laser beam LB. Therefore, it is possible to achieve uniform groove processing and groove depth, without contaminating optical components, and to produce a product having excellent iron loss characteristics.

Further, in the groove processing device 100, the position adjustment portion 34 adjusts the position of the shielding plate 35 in the scanning direction x in which scanning is performed with the laser beam LB by the polygon mirror 10. Therefore, in the groove processing device 100, when the laser beam LB that has passed through the lens 12 is moved from the center to the end portion of the steel sheet 20 along the scanning direction x, the shielding plate 35 is irradiated with the laser beam LB reflected by the plane mirror of the polygon mirror 10. As a result, a groove that has a uniform groove depth even in an end portion can be formed in the surface of the steel sheet 20. In addition, it is possible to adjust the range of the scanning direction x (the width direction of the steel sheet 20) in which the shielding plate 35 is irradiated with the laser beam LB.

Further, in the groove processing device 100, when the angle iv of the shielding plate 35 is adjusted, it is desirable to set the angle ψ in the range of 2θc<ψ≤90(°) while satisfying Lp0<L2 as a constraint condition. Furthermore, it is desirable that the most desirable angle ψ of the shielding plate 35 is in the range of 2θc<ψ≤90(°) and in the angle range of the central angle±5(°) satisfying the constraint condition of Lp0<L2. As described above, the angle ψ of the shielding plate 35 is adjusted to the range of 2θc<ψ≤90(°) and to the angle range of the central angle±5(°) satisfying the constraint condition of Lp0<L2 to more reliably reduce the damage of the shielding plate 35 by the laser beam LB.

In addition, the shielding plate according to the above-described embodiment may be formed of a material that absorbs the laser beam LB. For example, a black alumite treatment or absorption lacquer coating is performed on the surface of the shielding plate in order for the shielding plate to absorb the energy of the laser beam. Further, a water channel may be provided in the shielding plate to perform indirect water cooling in order to cool the shielding plate.

Furthermore, in the above-described embodiment, the groove processing device 100 provided with both the position adjustment portion 34 and the angle adjustment portion 36 has been described. However, the invention is not limited thereto, and the groove processing device may be provided with only the angle adjustment portion 36.

Moreover, in the above-described embodiment, the case in which the position adjustment portion 34 which is the guide groove is applied as the position adjustment portion has been described. However, the invention is not limited thereto. For example, various configurations of mechanisms may be applied as long as they can move the shielding plate 35 in the scanning direction of the laser beam LB.

Further, in the above-described embodiment, as the angle adjustment portion, the angle adjustment portion 36 is provided which rotates on the rotating portion 37a provided at the base end of the shielding plate 35 to move the shielding plate 35 along the guide portion 37b, thereby inclining the shielding plate 35. However, the invention is not limited thereto. For example, only the rotating portion 37a may be provided to rotate the shielding plate 35 such that the angle can be adjusted, or only the guide portion 37b may be provided to incline the shielding plate 35 such that the angle can be adjusted.

EXAMPLES

Next, examples will be described. Here, first, the laser power of the laser beam LB or the like was defined, and the angle θ0 formed between the reference position (θ=0(°)) in the plane mirror of the polygon mirror 10 and the boundary with an adjacent plane mirror was calculated. In addition, the critical angle θc was calculated from the above-mentioned Expression (1).

In this case, when the laser power of the laser beam LB was 1000 (W), the radius φ of the laser beam LB was 6 (mm), the number of plane mirrors N in the polygon mirror 10 was eight, and the circumscribed radius R of the polygon mirror 10 was 140 (mm), the angle θ0 was 22.5(°), and critical angle θc was 19.9(°).

When the distance d between the point P and the point P1 was calculated from the above-mentioned Expression (2) assuming that the distance L1 from the plane mirror of the polygon mirror 10 to the lens 12 which was the condensing optical system was 50 (mm), the distance L2 from the lens 12 to the height of the point P of the shielding plate 35 was 150 (mm), and the focal length f of the lens 12 was 200 (mm), the distance d was 164.7 (mm).

From the above, the position adjustment portion 34 can adjust the position of the shielding plate 35 in the scanning direction of the laser beam LB on the basis of the calculation result of the distance d.

Figure 6:
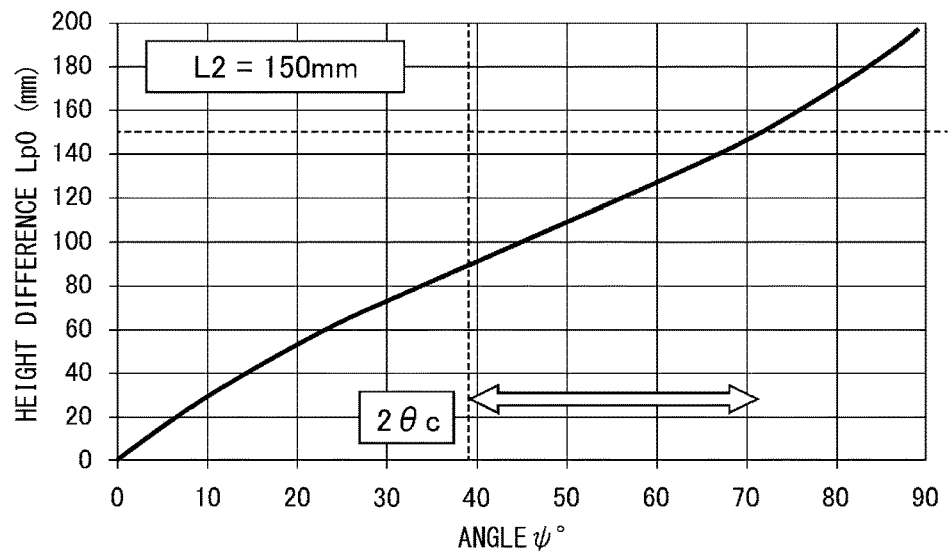
FIG. 6 is a graph showing a relationship between an angle $\psi$ of the shielding plate and a height difference Lp0.

Then, the height difference Lp0 between the point P and the point P0 when the shielding plate 35 was inclined at the angle ψ was calculated, and the relationship between the angle ψ of the shielding plate 35 and the height difference Lp0 was investigated. The results shown in FIG. 6 were obtained. In FIG. 6, the horizontal axis indicates the angle ψ(°) of the shielding plate 35, and the vertical axis indicates the height difference Lp0 (mm) between the point P and the point P0 when the shielding plate 35 is inclined at the angle ψ.

Here, as described in the embodiment, it is desirable that the angle ψ of the shielding plate 35 with respect to the surface of the steel sheet 20 is adjusted in the range of 2θc<ψ≤90(°) and that Lp0<L2 is satisfied as a constraint condition. Therefore, it was confirmed from FIG. 5 that the minimum angle 2θc(°) of the angle ψ of the shielding plate 35 was about 40(°) and the maximum angle of the angle ψ of the shielding plate 35 was about 70(°) from the constraint condition.

In addition, it can be seen that the optimum range of the angle ψ of the shielding plate 35 is from 40(°) to 70(°) and the most desirable angle ψ is 55(°) which is the central angle. From the above, the angle adjustment portion 36 can adjust the angle ψ of the shielding plate 35 on the basis of the above-mentioned calculation results.

INDUSTRIAL APPLICABILITY

According to the invention, the shielding plate is inclined to reduce the damage of the shielding plate which occurs when the shielding plate blocks the laser beam. Therefore, it is possible to provide a groove processing device and a groove processing method that suppress the contamination of optical components and achieve uniform groove processing and groove depth. Therefore, the invention has extremely high industrial applicability.

BRIEF DESCRIPTION OF THE REFERENCE SYMBOLS

10 Polygon mirror
11 Light source device
12 Lens
20 Steel sheet
34 Position adjustment portion
35 Shielding plate
36 Angle adjustment portion
100 Groove processing device
101, 102 Plane mirror
LB Laser beam

The invention claimed is:

1. A groove processing device that forms a groove in a surface of an object using laser beams, the groove processing device comprising:
   a light source device that outputs the laser beams;
   a polygon mirror that reflects the laser beams output from the light source device such that the laser beam is scanned on the object;
   a condensing optical system, including a condensing lens or a mirror, that is provided on an optical path of the laser beams reflected by the polygon mirror and focuses the laser beams; and
   a shielding plate that is provided between the condensing optical system and the object at a position which blocks some of the laser beams focused through the condensing optical system and blocks some of the laser beams,
   wherein, among the laser beams focused through the condensing optical system, some of the laser beams that are not blocked by the shielding plate form the groove in the surface of the object at a focus of the laser beams,
   the shielding plate is configured to be inclinable so that the side closer to the center of the scan is the focus side and the side closer to the outside of the scan is the condensing optical system side, and
   the shielding plate is provided between the condensing optical system and the object and a sheet surface on which the laser beam is irradiated in the shielding plate is rotated with respect to the surface of the object in a direction in which the angle of the shielding plate changes with respect to the surface of the object so as to block the laser beams that do not form the groove.

2. The groove processing device according to claim 1, wherein, when an angle of the shielding plate with respect to the surface of the object is ψ and a critical angle which is a maximum angle at which the laser beam falls within one plane mirror of the polygon mirror is θc(°), the angle ψ of the shielding plate is inclined in a range of 2θc<ψ≤90 (°).

3. The groove processing device according to claim 2, wherein, assuming that a position where a perpendicular line is drawn from a rotation axis of the polygon mirror to the plane mirror of the polygon mirror is a reference position, an angle formed between a boundary between two adjacent plane mirrors of the polygon mirror and the reference position is θ0 (°), a position where the shielding plate, which is inclined at the angle ψ, is irradiated with the laser beam reflected by the polygon mirror at an angle of 2θ0 (°) when a rotation angle of the polygon mirror is θ0(°) is a point P0, a position where the shielding plate, which is inclined at the angle ψ, is irradiated with the laser beam reflected by the polygon mirror at an angle of) 2θc(°) when the rotation angle of the polygon mirror is θc(°) is a point P, a height difference between the point P and the point P0 is Lp0, and a distance from the condensing optical system to a height of the point P is L2, Lp0<L2 is satisfied.

4. The groove processing device according to any one of claims 1 to 3, further comprising:
   a position adjustment portion, including a guide groove that adjusts a position of the shielding plate in a scanning direction in which scanning is performed with the laser beams by the polygon mirror.

5. The groove processing device according to claim 1, further comprising:
   a housing that has the shielding plate disposed in a lower portion,
   wherein the housing has an upper opening portion that is located on the optical path of the laser beams focused by the condensing optical system, and
   a colorless and transparent window plate that transmits the laser beams without absorbing or reflecting the laser beams is attached to the upper opening portion.

6. A groove processing method that forms a groove in a surface of an object using laser beams, the groove processing method comprising:
   an output step of outputting the laser beams from a light source device;

a reflection step of reflecting the laser beams output from the light source device such that the laser beam is scanned on the object by a polygon mirror;

a condensing step of focusing the laser beams on the surface of the object using a condensing optical system, including a condensing lens or a mirror, that is provided on an optical path of the laser beams reflected by the polygon mirror; and a shielding step of blocking some of the laser beams using a shielding plate that is provided between the condensing optical system and the object at a position which blocks some of the laser beams focused through the condensing optical system, wherein, among the laser beams focused through the condensing optical system, some of the laser beams that are not blocked by the shielding plate form the groove in the surface of the object at a focus of the laser beams, the shielding plate is configured to be inclinable so that the side closer to the center of the scan is the focus side and the side closer to the outside of the scan is the condensing optical system side, and in the shielding step, the shielding plate is provided between the condensing optical system and the object and a sheet surface on which the laser beam is irradiated in the shielding plate is rotated with respect to the surface of the object in a direction in which the angle of the shielding plate changes with respect to the surface of the object so as to block the laser beams that do not form the groove.

7. The groove processing method according to claim 6,
wherein, in the shielding step, when an angle of the shielding plate with respect to the surface of the object is w and a critical angle which is a maximum angle at which the laser beam falls within one plane mirror of the polygon mirror is $\theta c(°)$, the angle $\psi$ of the shielding plate is inclined in a range of $2\theta c < \psi \le 90$ (°).

8. The groove processing method according to claim 7,
wherein, in the shielding step, assuming that a position where a perpendicular line is drawn from a rotation axis of the polygon mirror to the plane mirror of the polygon mirror is a reference position, an angle formed between a boundary between two adjacent plane mirrors of the polygon mirror and the reference position is $\theta 0(°)$, a position where the shielding plate, which is inclined at the angle $\psi$, is irradiated with the laser beam reflected by the polygon mirror at an angle of) $2\theta 0(°)$ when a rotation angle of the polygon mirror is $\theta 0(°)$ is a point P0, a position where the shielding plate, which is inclined at the angle $\psi$, is irradiated with the laser beam reflected by the polygon mirror at an angle of $2\theta c(°)$ when the rotation angle of the polygon mirror is) $\theta c(°)$ is a point P, a height difference between the point P and the point P0 is Lp0, and a distance from the condensing optical system to a height of the point P is L2, Lp0<L2 is satisfied.

9. The groove processing method according to any one of claims 6 to 8, further comprising:
a shielding plate position adjustment step of adjusting a position of the shielding plate in a scanning direction in which scanning is performed with the laser beams by the polygon mirror.

10. The groove processing method according to claim 6, further comprising:
a housing attachment step of attaching a colorless and transparent window plate that transmits the laser beams without absorbing or reflecting the laser beams to an upper opening portion of a housing that has the shielding plate disposed in a lower portion and has the upper opening portion which is located on the optical path of the laser beams focused by the condensing optical system.

* * * * *